US009070264B2

(12) United States Patent
Sivertsen

(10) Patent No.: US 9,070,264 B2
(45) Date of Patent: Jun. 30, 2015

(54) DETECTING A SECURITY BREACH OF AN ELECTRONIC DEVICE

(75) Inventor: Clas Sivertsen, Lilburn, GA (US)

(73) Assignee: America Megatrends Inc., Norcross, GA (US)

( * ) Notice: Subject to any disclaimer, the term of this patent is extended or adjusted under 35 U.S.C. 154(b) by 35 days.

(21) Appl. No.: 13/186,142

(22) Filed: Jul. 19, 2011

(65) Prior Publication Data

US 2013/0024952 A1 Jan. 24, 2013

(51) Int. Cl.

*G06F 1/26* (2006.01)
*G08B 13/08* (2006.01)
*G08B 13/181* (2006.01)
*G06F 11/00* (2006.01)

(52) U.S. Cl.

CPC .............. *G08B 13/08* (2013.01); *G08B 13/181* (2013.01)

(58) Field of Classification Search

CPC ...... G08B 13/126; G08B 13/08; G06F 1/181; G06F 11/2247; G06F 11/3089
USPC ........................................................... 726/34
See application file for complete search history.

(56) References Cited

U.S. PATENT DOCUMENTS

| | | | | |
|---|---|---|---|---|
| 5,537,938 | A | 7/1996 | Lopez, Jr. | |
| 5,790,019 | A | 8/1998 | Edwin | |
| 6,575,833 | B1 | 6/2003 | Stockdale | |
| 6,773,348 | B2 | 8/2004 | Stockdale | |
| 7,183,915 | B2 | 2/2007 | Bartholf et al. | |
| 7,339,473 | B2 * | 3/2008 | Lucas | 340/545.1 |
| 7,738,008 | B1 | 6/2010 | Ball | |
| 7,791,477 | B2 | 9/2010 | Sharma | |
| 2005/0183338 | A1 * | 8/2005 | Kasai et al. | 49/26 |
| 2006/0232380 | A1 * | 10/2006 | Lucas | 340/5.72 |
| 2007/0035255 | A1 * | 2/2007 | Shuster et al. | 315/200 R |
| 2007/0063841 | A1 * | 3/2007 | Babich et al. | 340/545.1 |
| 2007/0080806 | A1 * | 4/2007 | Lax et al. | 340/572.1 |
| 2007/0155512 | A1 | 7/2007 | Wells et al. | |
| 2009/0115580 | A1 * | 5/2009 | Koerner et al. | 340/10.1 |
| 2009/0174550 | A1 * | 7/2009 | Aninye et al. | 340/539.13 |
| 2009/0267743 | A1 * | 10/2009 | Faroe et al. | 340/10.1 |
| 2009/0294675 | A1 | 12/2009 | Jang et al. | |
| 2010/0127848 | A1 * | 5/2010 | Mustapha et al. | 340/505 |
| 2010/0134295 | A1 * | 6/2010 | Lax et al. | 340/572.8 |
| 2010/0163731 | A1 * | 7/2010 | Haran et al. | 250/340 |
| 2010/0176950 | A1 * | 7/2010 | Bartholf et al. | 340/572.7 |
| 2010/0195446 | A1 * | 8/2010 | Michaels et al. | 367/135 |

(Continued)

OTHER PUBLICATIONS

International Search Report dated Oct. 12, 2012 in PCT/US12/047703.

*Primary Examiner* — Ashok Patel
*Assistant Examiner* — Gary Gracia
(74) *Attorney, Agent, or Firm* — Lee & Hayes, PLLC

(57) ABSTRACT

A system and method for detecting a security breach of an electronic device are provided. The system includes a sensor assembly having at least one IR LED which outputs IR light, and an IR sensor which detects the IR light output by the IR LED and outputs corresponding IR detection signals. The system further includes a processor which generates an IR profile of an interior of the enclosure with reference to the IR detection signals output by the IR sensor. The processor determines that there has been a security breach of the enclosure at least in response to detecting IR activity in the enclosure from the IR detection signals that does not correspond to the IR profile. Output signals from a various other sensors may be used to confirm whether the security breach has occurred.

14 Claims, 5 Drawing Sheets

(56) References Cited

U.S. PATENT DOCUMENTS

| | | | | |
|---|---|---|---|---|
| 2010/0265069 | A1* | 10/2010 | Michaels et al. | 340/572.3 |
| 2010/0277296 | A1* | 11/2010 | DeMille | 340/426.1 |
| 2010/0332359 | A1* | 12/2010 | Powers et al. | 705/28 |
| 2011/0012746 | A1* | 1/2011 | Fish et al. | 340/691.6 |
| 2011/0087370 | A1* | 4/2011 | Denison et al. | 700/236 |
| 2011/0187496 | A1* | 8/2011 | Denison et al. | 340/5.53 |
| 2011/0203276 | A1* | 8/2011 | Friedrich et al. | 60/645 |
| 2012/0169500 | A1* | 7/2012 | Stern | 340/572.1 |
| 2012/0217882 | A1* | 8/2012 | Wong et al. | 315/185 R |

* cited by examiner

DETECTING A SECURITY BREACH OF AN ELECTRONIC DEVICE

TECHNICAL FIELD

The disclosure is related to a system and method for detecting a security breach of an electronic device. More particularly, an infrared sensor unit develops an infra-red mapping of an enclosure of the electronic device that can be used in detecting a security breach.

BACKGROUND

Many electronic devices contain valuable articles or data, and therefore, various types of security mechanisms are used with such electronic devices. As an example, automatic teller machines (ATMs) and gaming machines are often equipped with a security system placed in an enclosure of the electronic device. A mechanical switch on an access panel is commonly used as a core component in an internal security system. Mechanical switches, however, can be easily tampered with by mechanical blocking, shorting, cutting wires, modifying terminals, etc. Moreover, the switch can be in easily identified and therefore can be quickly located by those desiring to disable the switch. Various different types of switches are used in conventional security systems, but many of these components can be easily identified as to their function, and increases the cost of the device. Further, these units must be designed and installed into the physical enclosure often entailing mechanical fasteners, connectors, wires, etc.

Some security systems used in an enclosure of an electronic device include a plurality of different sensors. However, as in the case of the mechanical switch, each sensor can be quickly located and thereafter altered or bypassed. Oftentimes, the sensors are very rudimentary and so can they can be easily disabled or manipulated in a way to deceive the security system.

Therefore, there is a need for an inexpensive yet effective security device for an electronic device. It is with respect to these considerations and others that the present invention has been made.

SUMMARY

It should be appreciated that this Summary is provided to introduce a selection of concepts in a simplified form that are further described below in the Detailed Description. This Summary is not intended to be used to limit the scope of the claimed subject matter.

Accordingly, at least one exemplary embodiment may provide a security system for detecting a security breach of an enclosure of an electronic device. The security system according to this embodiment may comprise a sensor assembly and a processor. The sensor assembly may comprise at least one infrared ("IR") light-emitting diode ("LED") which outputs IR light, and an IR sensor which detects the IR light output by the IR LED and subsequently outputs corresponding IR detection signals. The processor is configured to generate a first IR profile of an interior of the enclosure using the IR detection signals output by the IR sensor during a first time period. The processor is configured to further receive IR detection signals during a second time period and generate a second IR profile of the interior of the enclosure. The processor determines whether that there has been a security breach of the enclosure by comparing the first IR profile with the second IR profile.

In another exemplary embodiment, a method for detecting a security breach of an enclosure of an electronic device is provided. The method comprises generating IR light by one or more IR LEDS, detecting the IR light by at least one IR sensor generating IR detection signals, and receiving the IR detection signals by a processor during a first time period. The processor generates a first IR profile of an interior of the enclosure and stores the first IR profile in a memory. The processor receives the IR detection signals during a second time period and generates a second IR profile of the interior of the enclosure, and compares the first IR profile with a second IR profile to determine whether there has been a security breach of the enclosure.

In another exemplary embodiment, a computer-readable storage medium has computer readable instructions stored thereupon that, when executed by a computer, cause the computer to receive IR detection signals during a first time period from at least one IR sensor detecting "IR" light generated by one or more IR LEDs, generate a first IR profile of an interior of the enclosure, and store the first IR profile in a memory. The instruction also cause the processor to receive IR detection signals during a second time period from the at least one IR sensor, generate a second IR profile of an interior of the enclosure, and compare the first IR profile with a second IR profile to determine whether there has been a security breach of the enclosure.

These and other embodiments and advantages of the present invention may become apparent from the following detailed description, taken in conjunction with the accompanying drawings, illustrating by way of example the principles of the invention.

DETAILED DESCRIPTION

Figure 1:
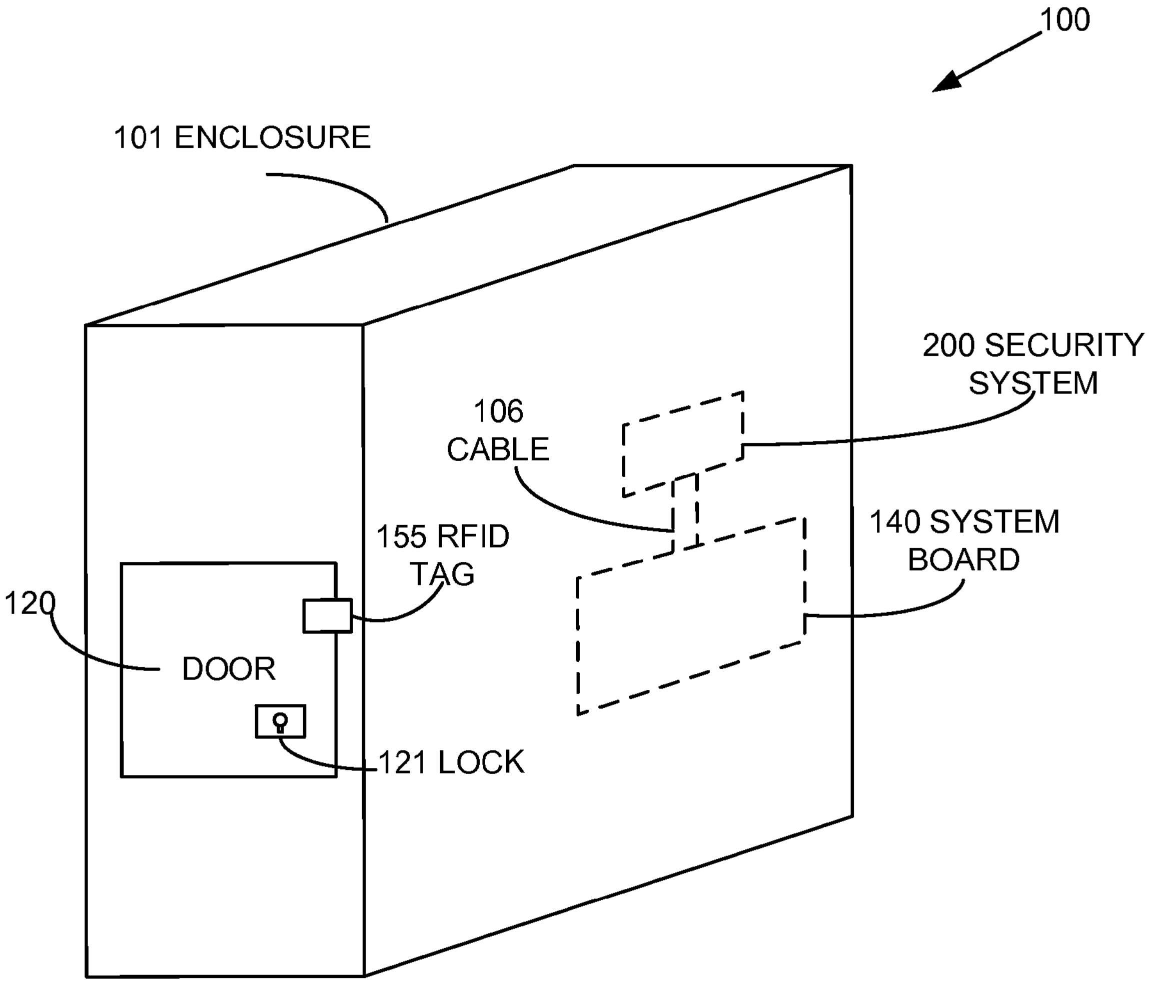
FIG. 1 is a schematic perspective view of one embodiment of an enclosure of an electronic device according to the disclosure provided herein.

Embodiments disclosed herein provide a system and method for detecting a security breach of an enclosure of an electronic device. In the following detailed description, references are made to the accompanying drawings that form a part hereof, and in which are shown by way of illustration specific embodiments or examples. Referring now to the drawings, in which like numerals represent like elements through the several figures, aspects of the present invention will be described.

FIG. 1 shows an electronic device 100 comprising an enclosure 101. The electronic device 100 may be an ATM, a gaming machine, a server, a digital sign, a personal computer, or any other device requiring security for its contents or accessing data held/stored therein. A door 120 providing access to the interior of the enclosure 101 is disposed on the front of enclosure 101. A mechanical lock 121 is provided on the door 120 for locking and unlocking the door 120. Attached to the door may be a tamper resistant RFID tag 155. The RFID tag 155 comprises an antenna (not shown) mounted on a substrate (not shown). The RFID tag 155 may be mounted on the outside of door 120 of the enclosure 101, as shown in FIG. 1. The RFID tag can be attached after service personnel have accessed the system (e.g., for servicing).

A system board 140 is disposed inside the enclosure 101 and may be mounted in a conventional manner, using standoffs, mounting brackets, etc. The system board 140 holds many key circuit components of the electronic device 100. The system board 140 may have a USB (universal serial bus) port or other type of interface.

A security system 200 for detecting a security breach of the enclosure 101 of the electronic device 100 according to an embodiment may be connected to the USB port of the system board 140 of the electronic device 100 via cable 106. In some embodiments, the security system 200 is attached to an interior wall of the enclosure 101 or can be attached directly to the system board 140 of the electronic device 100. Other connection arrangements can be used.

Figure 2:
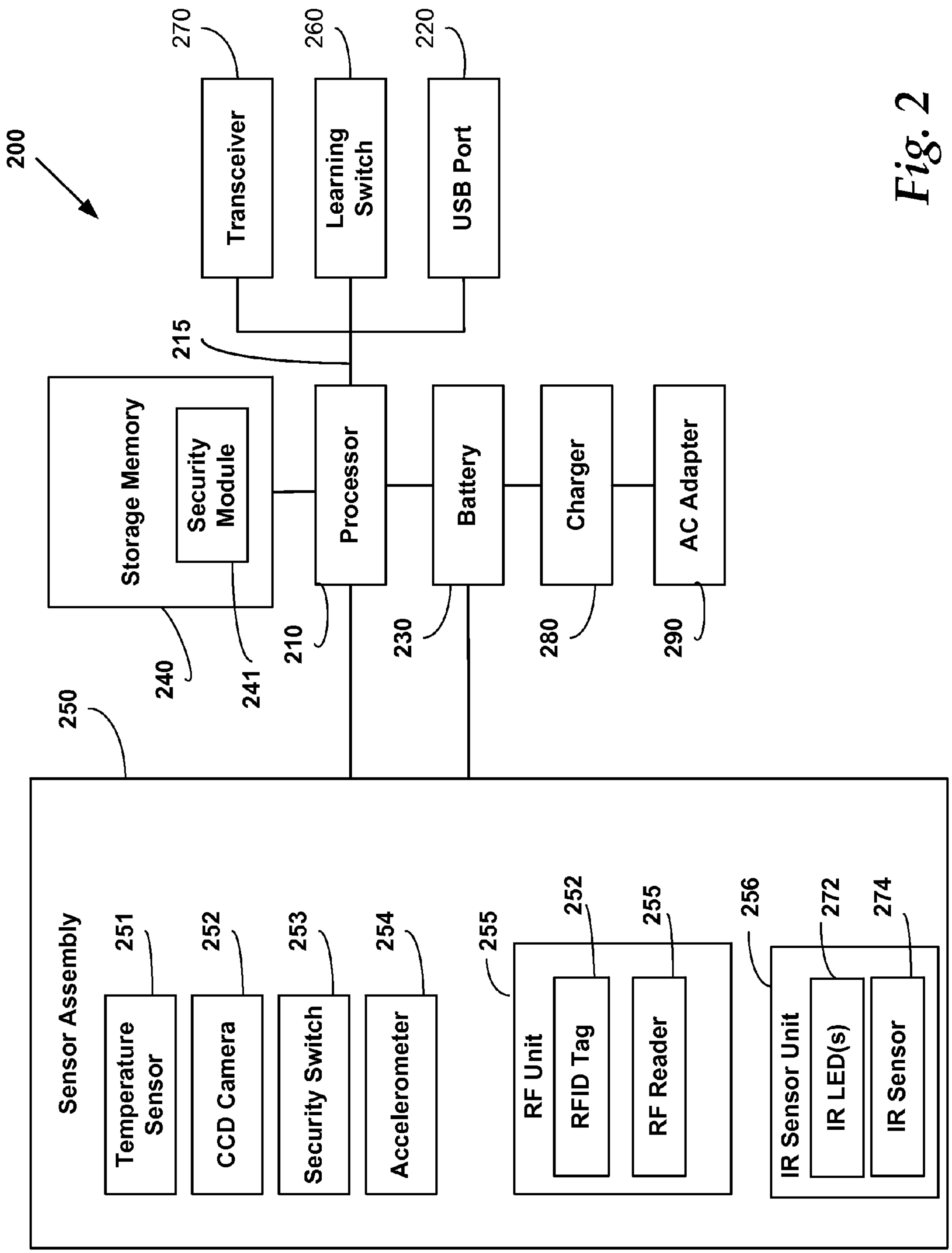
FIG. 2 is a block diagram illustrating various components of one embodiment of a security system for detecting a security breach according to the disclosure provided herein.

Referring now to FIG. 2, the security system 200 is illustrated in greater detail. In this embodiment, the security system comprises a processor 210, a USB connector 220 for an associated USB port functionality, a battery 230, a memory 240, a sensor assembly 250, a learning switch 260, a transceiver 270, a charger 280, and an AC (alternating current) adapter 290.

The processor 210 performs overall control of the security system 200 and is coupled to various other components of the security system 200 via bus 215, namely, the USB connector 220, the battery 230, the memory 240, the sensor assembly 250, the learning switch 260, and the transceiver 270.

The processor 210 may be constructed from any number of transistors or other circuit elements, which may individually or collectively assume any number of states. More specifically, the processor 210 may operate as a state machine or finite-state machine. Such a machine may be transformed to a second machine, or a specific machine, by loading executable instructions contained within the program modules. These computer-executable instructions may transform the processor 210 by specifying how the processor 210 transitions between states, thereby transforming the transistors or other circuit elements constituting the processor 210 from a first machine to a second machine, wherein the second machine may be specifically configured to perform the operations disclosed herein. The states of either machine may also be transformed by receiving input from one or more sensors 250, input switches 260, or other peripherals. Either machine may also transform states, or various physical characteristics of various output devices such as printers, speakers, video displays, or otherwise.

The USB port 220 is used to connect the processor 210 to the system board 140 of the electronic device 100 using the cable 106. In some embodiments, the security system 200 may be embedded into the system board 140 of the electronic device 100, rather than being connected to the system board 140 through the USB port 220. For example, the schematic of the security system 200 may be given to the manufacturer of the electronic device 100, and the manufacturer may embed or integrate the security system 200 into the system board 140 of the electronic device 100. Integrating the security system 200 into the system board 140 offers advantages in that it would be hard to distinguish the components of the security system 200 from the circuit components of the system board 140. Hence, it would be difficult to locate the components of the security system 200 and somehow disable the same with the aim of stealing data or items from inside the enclosure 101 of the electronic device 100.

The battery 230 is coupled to the processor 210 as described above, and can provide port to the USB port 220. Power can be provided from battery to the sensor assembly 250. In one embodiment, the battery 230 provides power to all components of the security system 200. In other embodiments, when the USB connector 220 is coupled to the USB port 141 of the system board 140 of the electronic device 100, all components of the security system 200 may receive power through the USB connection (i.e., may receive power from the electronic device 100). In some embodiments, the battery 230 is charged by connection to AC power through the AC adapter 290.

In embodiments where the security system 200 is integrated into the system board 140 of the electronic device 100, the USB port 220, the battery 230, the charger 280, and the AC adapter 290 may be dispensed from the configuration of the security system 200. In other embodiments, the security system 200 can be a daughter board mounted on the system board and connecting using a short USB cable via the USB port. In such embodiments, when the electronic device 100 is turned off, the security system 200 may obtain power for operation from an internal battery (not shown) of the electronic device 100, or from another power source of the device 100.

The storage memory 240 is used to store programs for use by the processor 210 and can comprise in one embodiment mass storage media. One such program stored is the security module 241, which stores instructions which when executed cause the processor to perform the methods disclosed herein. The memory 240 may also be used to store processing results of the processor 210. This may include storing data representing an infrared profile of the interior of the enclosure 101. The memory may also be used to store image data. The memory 240 is connected to the processor 210 through a mass storage controller (not shown) connected to the bus 215. The memory 240 and its associated computer-readable media provide non-volatile storage for the processor 210. Although the description of computer-readable media contained herein refers to a mass storage device, such as a hard disk or CD-ROM drive, it should be appreciated by those skilled in the art that computer-readable media can be any available media that can be accessed by the system 200.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the system 200.

The sensor assembly 250 comprises a temperature sensor 251, a camera 252, a security switch 253, an accelerometer 254, a radio frequency ("RF") unit 255, and an infrared ("IR") sensor unit 256. Other embodiments may use a subset of these sensors, or additional sensors. The temperature sensor 251 detects temperature in the enclosure 101 of the electronic device 100 and outputs a corresponding temperature signal to the processor 210. The camera 252 obtains images of the interior of the enclosure 101 of the electronic device 100 and outputs a corresponding image signal to the processor 210. As an example, the camera 252 may be a micro CCD (charge-coupled device) camera.

The security switch 253 may be a mechanical switch, a magnetic switch, optical switch, etc. The security switch 253 may be associated with the door 120 of the enclosure 101 of the electronic device 100 such that the security switch 253 closes or opens a circuit when the door 120 is opened. Whenever the door is opened, the security switch 253 is activated and outputs a switch signal.

The accelerometer 254 may be a single- or multi-axis accelerometer. The accelerometer 254 measures acceleration of the enclosure 101 of the electronic device 100 and outputs corresponding acceleration signals to the processor 210. Using the acceleration signals output by the accelerometer 254, the processor 210 may detect static aspects such as orientation, as well as dynamic aspects including acceleration, vibration, shock, and falling movement of the enclosure 101. These values may be recorded in memory as well.

The RF unit 255 comprises an RFID tag 252 and an RF reader 255. The RF reader 255 reads the RFID tag 252. The RFID tag 252 comprises an antenna (not shown) mounted on a substrate (not shown). The RFID tag 252 may be mounted with adhesive on the door 120 of the enclosure 101, as shown in FIG. 1. As an example, the substrate of the RFID tag 252 may be adhered to the door 120 of the enclosure 101, and when the door 120 is opened, the antenna of the RFID tag 252 is severed or rendered non-functional. When this occurs, the RF reader 255 outputs a signal to the processor 210 indicative of the break in the antenna of the RFID tag 252.

Using any one or a combination of the signals output by the temperature sensor 251, the camera 252, the security switch 253, the accelerometer 254, and the RF unit 255, the processor 210 may determine that there has been a breach in the security of the enclosure 101 of the electronic device 100. For example, it may be determined by the processor 210 from the acceleration signals output by the accelerometer 254 that the enclosure 101 of the electronic device 100 has been tilted and moved, and from the RF signals output by the RF unit 255 that the door 120 of the enclosure 101 has been opened. The processor 210 may conclude from such a combination of determinations that the security of the enclosure 101 of the electronic device 100 has been breached. As another example, the processor 210 may determine that the door 120 of the enclosure 101 has been opened by the switch signal output by the security switch 253, and this may be confirmed by the processor 210 checking the temperature signal output by the temperature sensor 251 indicating a sudden drop in temperature of the interior of the enclosure 101 at approximately the same time that the switch signal is received. Similarly, the processor 210 may conclude from the combination of these signals that there has been a security breach of the enclosure 101 of the electronic device 100.

The IR sensor unit 256 is described separately from the other components of the sensor assembly 250 since the way in which the processor 210 processes signal outputs from the IR sensor unit 256 is different from the way in which the processor 210 processes the signals output from the temperature sensor 251, the camera 252, the security switch 253, the accelerometer 254, and the RF unit 255.

The IR sensor unit 256 comprises one or a plurality of IR LEDs (light-emitting diodes) 272 and at least one IR sensor 274. In some embodiments, the IR LEDs 272 are disposed in fixed or random locations on the system board 140 of the electronic device 100. In other embodiments, the IR LEDs 272 are disposed in fixed or random locations anywhere within the enclosure 101 of the electronic device 100, including on the system board 140 of the electronic device 100. The IR LEDs 272 output infrared light.

The IR sensor 274 may be mounted on the system board 140 of the electronic device 100 or at another location in the enclosure 101 of the electronic device 100. A plurality of IR sensors 274 may be used. The IR sensor 274 detects the IR light output by the IR LEDs 272 and outputs corresponding IR detection signals to the processor 210. The processor 210 generates an IR profile of the interior of the enclosure 101 of the electronic device 100 using the IR detection signals output by the IR sensor 274. It is not necessary that the IR LEDs and the IR sensor are positioned in a "line-of-sight" arrangement. Specifically, the IR LED(s) and IR sensor are not required to detect an interruption of the line-of-sight path from the IR sensor and the IR LED to detect a potential security breach. The IR LED(s) generate IR waves that can be reflected and detected by the IR sensor. This facilitates placement of the devices in that they are not required to be mounted as separate components in certain positions relation to, e.g., an access door. The IR LED and IR sensor could be mounted on a circuit board, such as the system board 140, such that the IR LED generates IR waves into the enclosure, and the IR sensor senses the reflected IR waves.

A security breach of the enclosure 101 of the electronic device 100 results in changing the IR profile of the enclosure 101. For example, if the door 120 of the enclosure 101 is opened and a hand reaches into the enclosure 101, the IR profile of the enclosure 101 will change. In this case, the processor 210 determines that there has been a change in the IR profile of the enclosure 101 and therefore may determine there has been a breach in the security of the enclosure 101.

Some burglars attempt to fool alarm systems by mimicking the operation of components being monitored. In the case of the IR sensor unit 256, some burglars may attempt to emulate the IR pattern (including IR intensity) obtained by the IR LEDs 272 by introducing IR LEDs to somehow try to mimic the pattern seen by the IR sensor 274. To further protect against such attempts by burglars, in some embodiments, the IR LEDs 272 blink in a fixed or random pattern, making it virtually impossible to emulate the IR pattern formed by the IR LEDs 272.

In some embodiments, the processor 210 may first learn the IR profile of the interior of the enclosure 101. For example, when the electronic device 100 is a server, the electronic device 100 may include a rotating fan, a hard drive that spins (for example, during start up and intermittently thereafter), a CD-ROM (compact disc, read-only memory) tray that moves, indicators (not shown) on the system board 140 that illuminate (such as failure indicators), etc. All these devices in the server will produce IR disturbances that are part of the IR pattern, and this IR pattern could be learned by the processor 210. The processor may "read" the IR LEDS to ascertain a profile, and store it in memory for future reference. After learning the IR profile of the enclosure 101, the processor 210 would be able to distinguish between normal changes in the IR profile and abnormal disturbances.

In some embodiments, when the learning switch 260 is operated by a user, learning (or re-learning) by the processor 210 is initiated by the security module program. This process may be initiated when the electronic device 100 is first started up, when maintenance occurs, or an upgrade by a technician is needed. The learning or re-learning of the IR profile of the enclosure 101 could take place by the technician operating the learning switch 260.

In some embodiments, when the processor 210 determines that there has been a security breach of the enclosure 101 of the electronic device 100, the processor 210 may take several subsequent actions. For example, the processor 210 may send an appropriate notification using one or more communication means, including an email, send an SMS (short message service) message, transmit a security breach signal to an external device or to a web portal via a communication network, etc. In some embodiments, the transmission of a message or signal takes place through the transceiver 270 in cooperation with a wired or wireless communication network (not shown). For example, the processor 210 may wirelessly transmit a security breach signal to a web portal via a cellular telephone network and the Internet, after which the web portal may subsequently remove a security authentication of the electronic device 100 in response to receiving the security breach signal.

In some embodiments, the processor may report the data from the sensors periodically over the communication network. A center may collect data, and determine from the sensor data when a security breach has occurred.

In other embodiments, the processor may check inputs from other sensors in order to ascertain the presence of a security breach. For example, a change in the IR pattern due to a security breach may also be accompanied by an interruption of the RFID signal. Other sensors, such as the accelerometer, may indicate abnormal signals consistent with the device being moved. In some circumstances, a signal from only one of the sensors may not be dispositive of a security breach. For example, a minor earthquake may trigger the accelerometer. A failure in the environmental air conditioning system may trigger the temperature sensor, and so forth. In addition, a failure of a sensor may trigger an incorrect indication of a security breach. Thus, checking inputs from other sensors can confirm the existence of a security breach.

In some embodiments, the processor 210 may do one of the following in response to determining that there has been a security breach of the enclosure 101 of the electronic device: trigger an audible alarm, trigger an ink-cartridge to explode (for example, when the electronic device 100 is an ATM), shut down the electronic device 100, erase all or specific data in a memory of the electronic device 100 and/or the memory 240 of the security system 200, transmit a security breach signal to a web portal as described above, etc.

Figure 3:
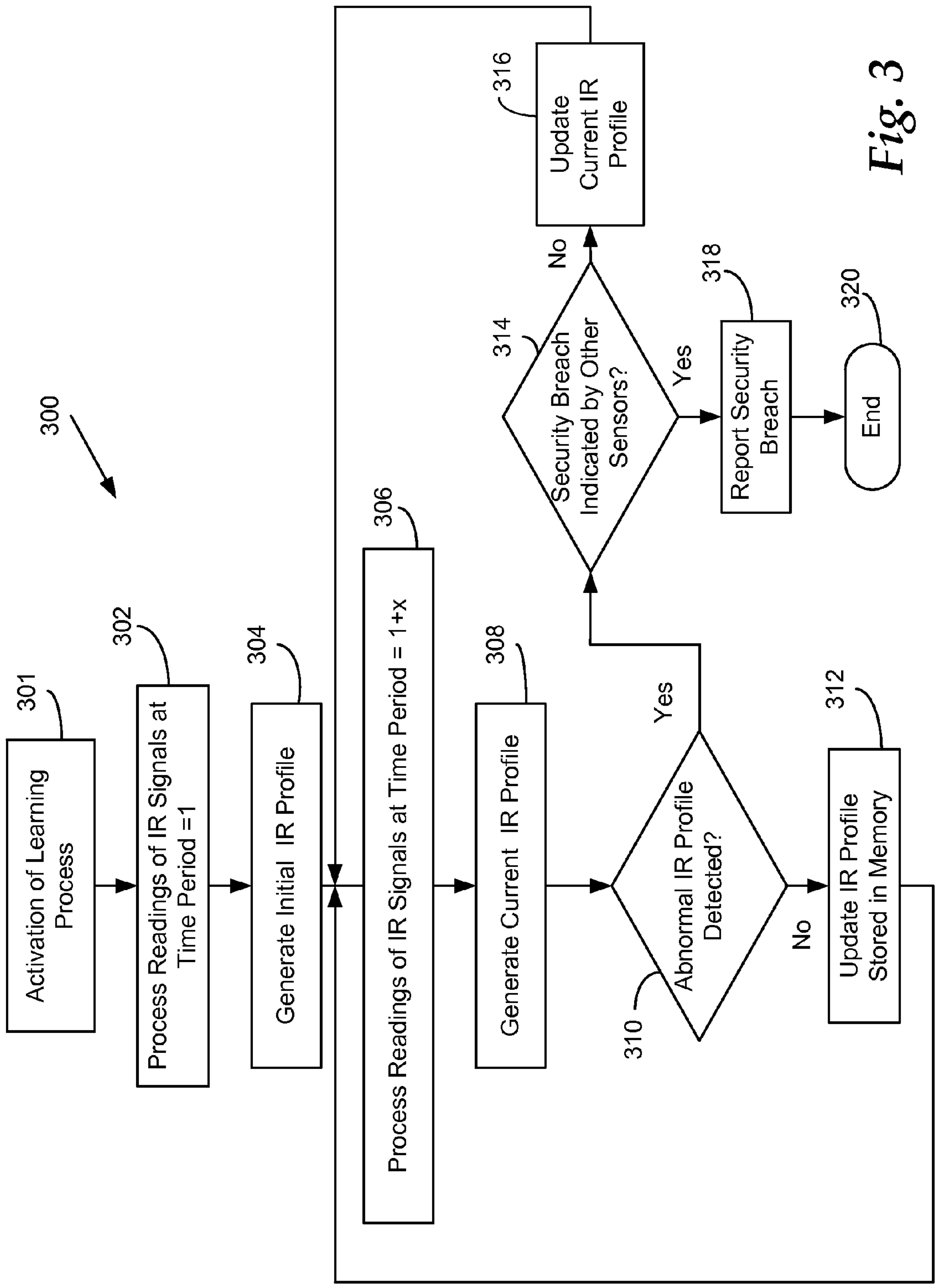
FIG. 3 is a flow diagram illustrating one embodiment of a method for establishing an infrared map of an enclosure of an electronic device and detecting a security breach of the enclosure using the infrared map according to the disclosure provided herein.

Referring now to FIG. 3, a flow diagram 300 illustrates one embodiment of a method of the security module to establish an infrared map of the enclosure of the electronic device and for detecting a security breach of the enclosure using the infrared map.

The flow diagram 300 begins at operation 301, which can begin when power is initially applied, or when the leaning switch 260 is activated. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed, and in any order, than those shown and described herein.

Other conditions may cause the process to be initiated where the processor 210 learns or re-learns the IR profile of the interior of the enclosure 101. This may be required after a technician repairs or performs regular maintenance on the electronic device 100. Since the IR profile of the enclosure 101 may change after such repair or maintenance, it may be necessary for the processor 210 to re-learn the IR profile.

From operation 301, operation 302 occurs where the process receives and processes data from the IR sensors. The IR sensors receive data from the IR LEDs which are operational at this point. The process occurs during a fixed time period, which can be adjusted and range from a fraction of a second to several minutes. From this information, the processor in operation 304 develops an initial IR profile of the enclosure, which is stored in memory.

The processor will periodically obtain IR sensor data at a subsequent time period, e.g., time period 1+x, illustrated by operation 306. The time period for obtaining this may not be the same as when the initial IR profile was obtained. The duration and frequency of this time period can vary, and can be programmed into the processor. The IR sensor data from the subsequent time period is used to generate a current IR profile 308. The processor then compares the current IR profile with the initial IR profile in operation 310. If the difference exceeds a threshold, the processor may determine that the IR profile is abnormal, or has changed reflecting a possible security breach. If there is no change in the profile, then the processor may store or update the IR profile in memory in operation 312. In other embodiments, the IR profile may not be updated, and the initial IR profile is maintained as the reference.

If the IR profile is different from the initial IR profile, then in operation 314 the processor uses data from other sensors to confirm whether a security breach has occurred. This may involve processing data from one or more of the other components of the sensor assembly 250 (i.e., the temperature sensor 251, the camera 252, the security switch 253, and the RF unit 255) to confirm a security breach of the enclosure 101 of the electronic device 100. In other words, both the IR profile and the outputs of the components of the sensor assembly 250 are used to determine whether there has been a security bread of the enclosure 101.

If a security breach is confirmed, then in operation 318 the security system reports the breach as programmed, including the aforementioned methods. As described above, the processor 210 may do one or more of the following: trigger an audible alarm, trigger an ink-cartridge to explode (for example, when the electronic device 100 is an ATM), shut down the electronic device 100, erase all or specific data in a memory of the electronic device 100 and/or the memory 240 of the security system 200, transmit a security breach signal to an external device or a web portal via a communication network, etc.

The process then ends in operation 320. If there is no confirmation of a security breach, then in operation 316, the processor may update the IR profile, or otherwise record the status of the sensors in memory, along with a time value, and repeat the process of reading the IR signals at operation 306.

Figure 4:
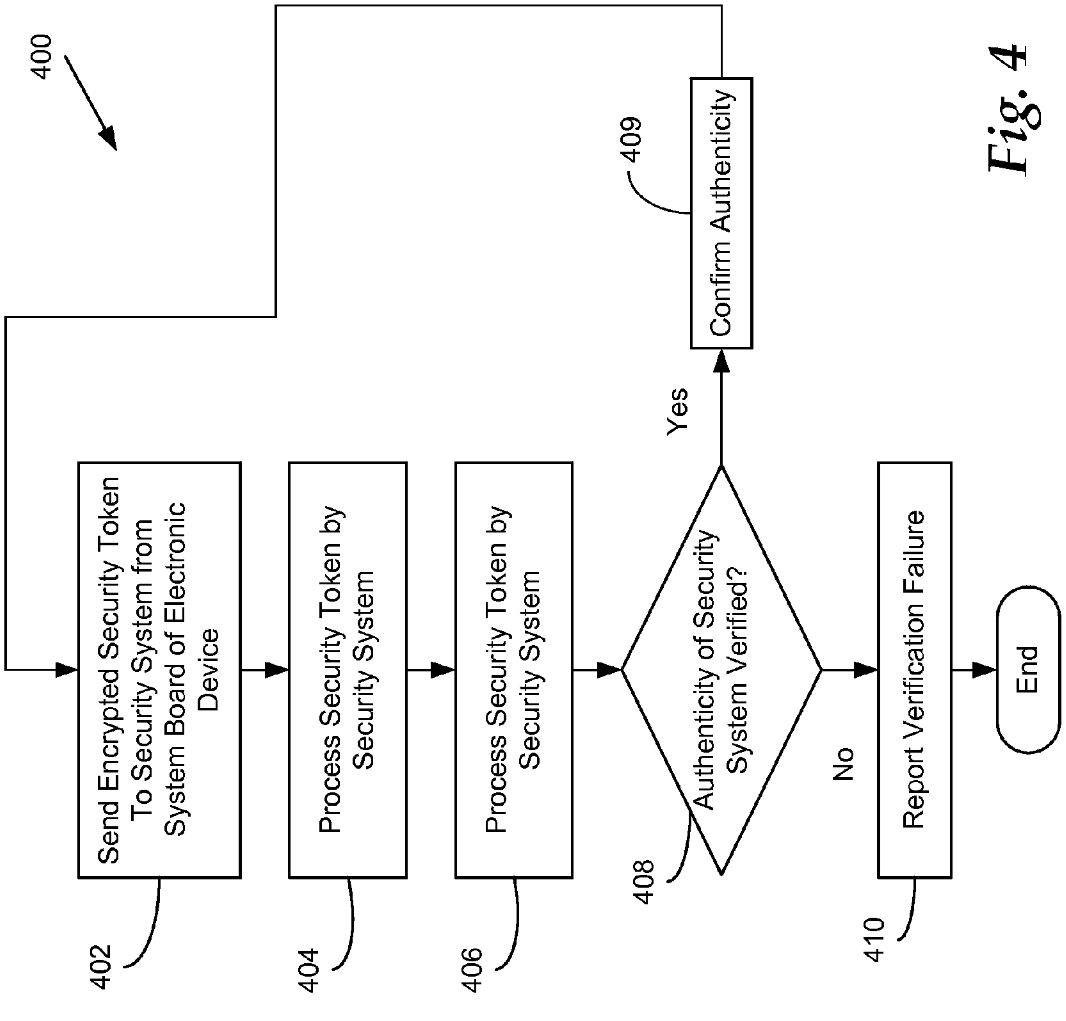
FIG. 4 is a flow diagram illustrating one embodiment of a method related to an exemplary authentication algorithm performed by cooperation between a system board of an electronic device and a security system for detecting a security breach of the an enclosure according to the disclosure provided herein.

Referring now to FIG. 4, a flow diagram illustrates one embodiment of a method related to an exemplary authentication algorithm involving communication between the system board of an electronic device and the security system for detecting a security breach of an enclosure of the electronic.

The routine 400 begins at operation 402, where the system board 140 of the electronic device 100 sends an encrypted security token to the security system 200. From operation 402, the routine 400 continues to operation 404, where the processor 210 of the security system 200 processes the security token and transmits a reply to the system board 140 of the electronic device 100.

From operation 404, the routine 400 continues to operation 406, where the security token is processed. This may involve any of the well-known encryption techniques, including digital encryption standard ("DES") processing, hash functions, etc. A determination is made by the system board 140 in operation 408 as to whether the authenticity of the security system 200 is verified on the basis of the reply sent by the security system 200. If the authenticity of the security system 200 is not verified, the system board 140 of the electronic device 100 takes appropriate action in operation 410. For example, the system board 140 may shut down the electronic device 100 and/or may send an alert, such as a text message or email.

If, at operation 406, the authenticity of the security system 200 is verified, the operation 400 branches to operation 409, where the system board 140 of the electronic device 100 confirm the result with the security board 200. In one embodiment, after a pre-defined time period, the process is repeated by returning to operation 402 as described above. This process results in a continuous verification of the security system to the system board 140.

The security provided by the method of FIG. 4 may be used in addition to the security provided by the security system 200. Many advantages may be realized through implementation of the method of FIG. 4. For example, when the processor 210 of the security system 200 determines that there has been a security breach of the enclosure, the processor 210 may send a text message through a wireless network notifying security personnel. A person desiring to steal contents or data from the electronic device 100 may be aware of such a security protocol and therefore attempt to block the wireless communication. By performing the method of FIG. 4, an additional layer of security is provided.

Figure 5:
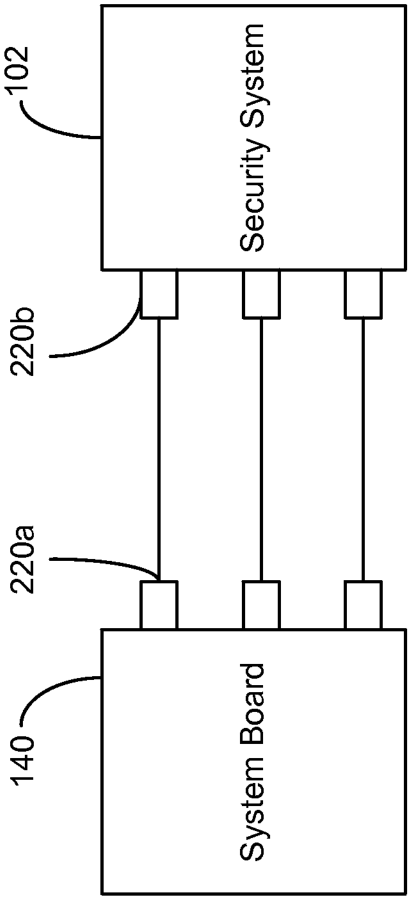
FIG. 5 is a schematic diagram illustrating one embodiment of various possible connections between a system board of an electronic device and a security system for detecting a security breach of system board of an enclosure of the electronic device according to an embodiment of the present invention.

Referring now to FIG. 5, it should be appreciated that various possible connections between the system board 140 of the electronic device 100 and the security system 200 are possible, and the authentication algorithm may take place through such various possible connections. For example, the security system 200 may be connected to the system board 140 of the electronic device 100 through a USB port as described above (i.e., through the USB port 220*a* of the system board 140 is connected to the USB port 220 of the security system 200), through a universal asynchronous receiver/transmitter ("UART") serial port connection, or through an ("$I^2C$") bus or SMBus (system management bus) connection.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A security system for detecting a security breach of an enclosure of an electronic device, the security system comprising:

a sensor assembly, including:

at least one infrared (IR) light-emitting diode (LED) that outputs IR light in a random pattern and is disposed within the enclosure of the electronic device, and an IR sensor that detects direct IR light and indirect IR light output by the at least one IR LED and outputs IR detection signals; and a processor that performs actions to:

receive a first set of IR detection signals from the IR sensor during a first time period, wherein at least a portion of the IR detection signals change during the first time period, based, at least in part, on IR disturbances that occur in the enclosure of the electronic device during the first time period, generate a first IR profile of an interior of the enclosure using the first set of IR detection signals output by the IR sensor that uses the direct IR light and the indirect IR light and accounts for the IR disturbances that occur in the enclosure of the electronic device, store the first IR profile that accounts for the IR disturbances in a memory, receive a second set of IR detection signals during a second time period, generate a second IR profile using the second set of IR detection signals, determine whether there has been a security breach of the enclosure by comparing the first IR profile with the second IR profile; and wherein if the first IR profile is different from the second IR profile, and if security breach of the enclosure has not taken place, update the first IR profile stored in memory in response to detecting a difference between the first IR profile and the second IR profile.

2. The security system of claim 1, wherein the sensor assembly further comprises at least one of:

a temperature sensor detecting a temperature in the enclosure and outputting a corresponding temperature signal to the processor, a camera obtaining an image of the interior of the enclosure and outputting a corresponding image signal to the processor, a security switch associated with a door of the enclosure which is activated when the door is opened and outputs a corresponding switch signal when activated, an accelerometer disposed on a system board and which measures acceleration of the enclosure and outputs a corresponding acceleration signal, and a radio frequency (RF) unit comprising a radio frequency identification (RFID) tag mounted on the door of the enclosure that is rendered non-functional when the door is opened, and an RF reader that reads the RFID tag and outputs an RF signal indicative of the non-functional status of the RFID tag, wherein the processor determines whether the security breach of the enclosure has occurred in response to both comparing the first IR profile with the second IR profile and any one or more signals output by the temperature sensor, the camera, the security switch, the accelerometer, and the RF unit.

3. The security system of claim 1, further comprising a learning switch, wherein the processor generates the first IR profile in response to activation of the learning switch.

4. The security system of claim 3, wherein the processor determines that the generation of the first IR profile is complete after a predetermined time following activation of the learning switch.

5. The security system of claim 3, wherein in response to determining that the security breach of the enclosure has occurred, the processor performs one or more of: triggers an audible alarm, triggers an ink-cartridge to explode, shuts down the electronic device, erases data in a memory of the electronic device, and transmits a security breach signal to an external device or to a web portal via a communication network.

6. The security system of claim 1, wherein the plurality of IR LEDs are disposed on a system board of the electronic device and at another location within the enclosure of the electronic device.

7. A method for detecting a security breach of an enclosure of an electronic device, the method comprising:

generating infrared (IR) light by one or more IR light-emitting diodes (LEDs) disposed within the enclosure of the electronic device, wherein the IR light is output by the one or more IR LEDs in a random pattern;

detecting the IR light by at least one IR sensor generating IR detection signals;

receiving the IR detection signals by a processor during a first time period and generating a first IR profile of an interior of the enclosure that accounts for IR disturbances in the enclosure of the electronic device, wherein at least a portion of the IR detection signals change during the first time period, based, at least in part, on IR disturbances that occur in the enclosure of the electronic device during the first time period;

storing the first IR profile in a memory;

receiving the IR detection signals by the processor during a second time period and generating a second IR profile of the interior of the enclosure;

comparing the first IR profile with a second IR profile to determine whether there has been a security breach of the enclosure; and wherein the processor updates the first IR profile stored in the memory in response to detecting a difference between the first IR profile and the second IR profile and the security breach of the enclosure has not been determined.

8. The method of claim 7, wherein the security breach of the enclosure is determined in conjunction with processing output signals from one of a temperature sensor, a camera, a security switch, an accelerometer, and a radio frequency (RF) unit.

9. The method of claim 7, further comprising the step of:

receiving an output from a learning switch, wherein the processor generates the first IR profile in response to an output signal from the learning switch.

10. The method of claim 9, wherein the processor determines that the generation of the first IR profile is complete after elapse of a predetermined time following receipt of the output signal.

11. The method of claim 7, further comprising, in response to determining the security breach of the enclosure has occurred, performing one or more of: triggering an audible alarm, triggering an ink-cartridge to explode, shutting down the electronic device, erasing all or specific data in the memory of the electronic device, and transmitting a security breach signal to an external device or to a web portal via a communication network.

12. A non-transitory computer-readable storage medium having computer readable instructions stored thereupon that, when executed by a computer, cause the computer to:

receive infrared (IR) detection signals during a first time period from at least one IR sensor detecting IR light generated by one or more IR light emitting diodes (LEDs), wherein the one or more IR LEDs is disposed in a random location within an enclosure and wherein the IR light is generated by the one or more IR LEDs in a random pattern;

generating a first IR profile of an interior of the enclosure that accounts for IR disturbances that occur in the enclosure of the electronic device during the first time period;

storing the first IR profile in a memory;

receiving IR detection signals during a second time period from the at least one IR sensor;

generating a second IR profile of the interior of the enclosure; comparing the first IR profile with a second IR profile to determine whether there has been a security breach of the enclosure; and updating the first IR profile stored in the memory in response to detecting a difference between the first IR profile and the second IR profile and the security breach of the enclosure has not been determined.

13. The computer-readable storage medium of claim 12 further comprising instructions which, when executed, cause the computer to:

receive signals from one of a temperature sensor, a camera, a security switch, an accelerometer, or a radio frequency (RF) unit; and confirm whether a security breach has occurred using the signals from one of the temperature sensor, the camera, the security switch, the accelerometer, or the RF unit.

14. The computer-readable storage medium of claim 12, wherein the first IR profile of the interior of the enclosure is generated in response to receiving an output signal from a learning switch.

* * * * *